Jan. 6, 1970 W. J. EVERS 3,487,960
TRANSFER DEVICE FOR STORAGE STRUCTURES AND THE LIKE
Filed Oct. 11, 1967

INVENTOR
WILLIAM J. EVERS
BY
Andrew J. Starke
Attorneys

United States Patent Office 3,487,960
Patented Jan. 6, 1970

3,487,960
TRANSFER DEVICE FOR STORAGE STRUC-
TURES AND THE LIKE
William J. Evers, Des Plaines, Ill., assignor to A. O.
Smith Harvestore Products, Inc., Arlington Heights, Ill.,
a corporation of Delaware
Filed Oct. 11, 1967, Ser. No. 674,498
Int. Cl. B65g 65/40; A01f 25/16
U.S. Cl. 214—17                                5 Claims

ABSTRACT OF THE DISCLOSURE

A rotary transfer device is mounted to maintain an essentially air-tight seal in a discharge passageway from a silo. A cylindrical casing has an inlet opening secured to a discharge passageway and a spaced discharge opening. The discharge passageway includes an unloader. A multiple vane element is rotatably mounted within the casing and coupled to the unloader. The vanes in engagement with the walls of the casing define a plurality of compartments between the adjacent vanes. The vanes are periodically indexed during operation of the unloader to sequentially align the chambers with the discharge opening and with the inlet opening. A gas source is connected to replace the air in the chamber with a substantially inert gas or other suitable gas before its alignment with the discharge passageway.

This invention relates to a transfer device for storage structures and the like and particularly to means for transferring material through an opening of a sealed storage device to prevent entrance of air into the vessel.

In my prior patent, 3,033,164, issued May 8, 1962, and assigned to a common assignee herewith, an animal feeding apparatus is described for preventing air contact with the feed material being transferred during the dispensing operation from a storage structure. As described in the above mentioned patent, a hopper is located above an animal feed trough in communication with a source of feed material, and a paddle or impeller is located in a cylindrical housing having an inlet communicating with the hopper, and an outlet communicating with the animal feed trough. The operation of the feed dispensing device is through a pawl and ratchet mechanism which rotates the impeller blades a given increment and deposits a quantity of feed into the feed trough. In this prior device, dispensing of the feed material was caused by the feeding animal moving the cover of the hopper and thus required positive action by the feeding animal. The feed transfer mechanism of the subject invention includes a positive mechanical drive to insure a constant feed dispensing rate and does not require actuation by a feeding animal.

The rotary feed transfer device of the subject invention has a drive system connected to the drive system of the main silo unloader, and each of the discharge chambers is connected to a source of inert purging gas, which positively displaces and atmospheric gases which might enter the discharge chamber from the discharge pipe after it has discharged feed material into the discharge pipe. The purging gas selected is one which is not harmful to the stored feed materials remaining in the sealed storage device. A typical example of a purging gas which might be used is carbon dioxide. Other protective gases are, of course, also considered within the scope of the invention. The particular stored material, and availability of the gases will, in most cases, determine what particular protective purging gas is selected.

The present invention is particularly directed to an improved transfer device for maintaining an essentially air-tight seal in a transfer passageway of a silo and similar structure to thereby substantially minimize the entrance of air or other damaging gaseous mediums into the storage structure. Generally, in accordance with the present invention, the opening is sealed by a transfer device having a plurality of chambers sequentially moved past the discharge passageway with the chambers filled with an inert or other appropriate gas prior to alignment with the discharge passageway. Although it is not essential within the broadest aspects of the present invention, a rotary transfer device provides a very convenient means for presenting the chambers. The rotary transfer device includes a cylindrical casing having an oppositely disposed discharge opening. A multiple vane rotatable element is rotatably mounted within the casing with the vanes in engagement with the walls of the casing to define a plurality of compartments between the adjacent vanes. The vanes are rotated or periodically indexed to sequentially align the chambers with the discharge opening and with the inlet opening. The chambers as they move from the discharge opening are connected to a gas transfer connection which includes a means to replace the air or other gases in the chamber with a substantially inert gas or other suitable gas which will not damage the stored products. The chamber filled with the nondamaging gases is then aligned with the discharge passageway and filled with the material. The subsequent indexing moves the material filled chamber from the inlet opening to the discharge opening. However, before the chamber with material is aligned with the discharge passageway, its trailing vane has moved from the discharge opening to completely seal the chamber from the discharge passageway and thus eliminate any danger of having air move into the discharge passageway.

The present invention thus provides a means to continuously transfer material from a storage structure or, if desired, introduce material into the structure without introducing of damaging gas products.

The drawings furnished herewith illustrate a preferred construction of the present invention in which the above advantages and features are clearly disclosed as well as others which will be clear from the following description.

Figure 1:
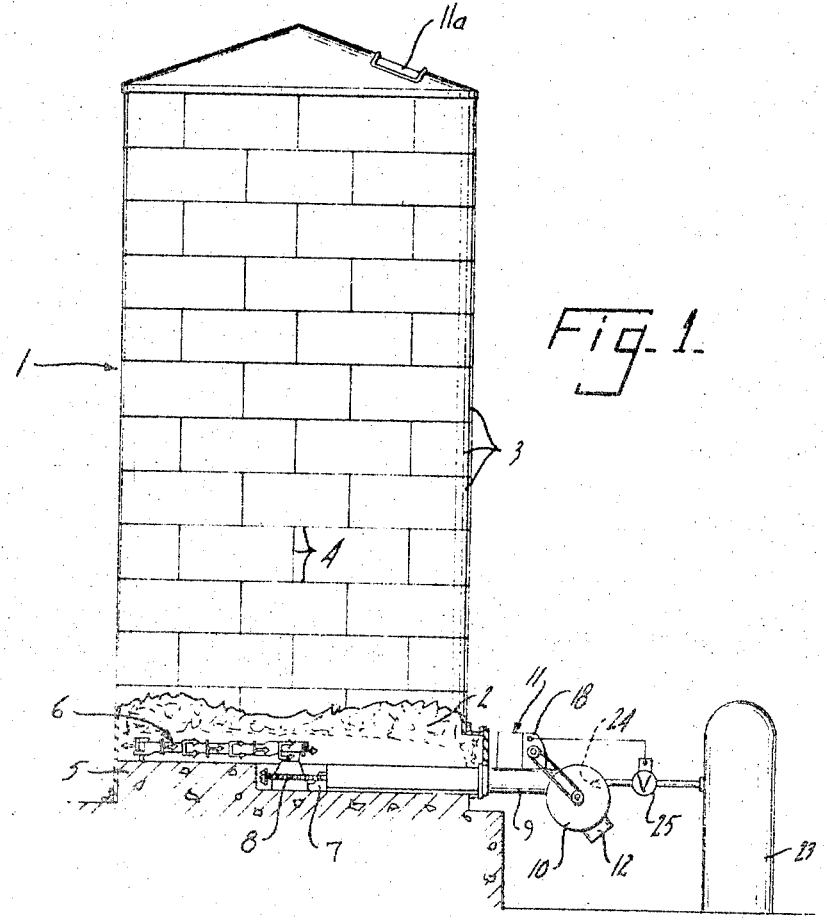
FIG. 1 is a diagrammatic illustration of a sealed silo unit including a rotary transfer device constructed in accordance with the present invention.

Referring to the drawings and particularly to FIG. 1, the present invention is illustrated applied to a cylindrical storage structure or silo 1 which may contain silage 2 or other material for substantial periods. The structure may be constructed in accordance with that disclosed in U.S. Patent 3,252,402 which issued May 24, 1966. The silo 1 generally is a hermetically sealed storage structure which is constructed from a plurality of glass-coated curved plates 3 having the interconnecting joints 4 sealed in any desired manner.

A breather bag or chamber, not shown, may be mounted within the upper portion of the silo to essentially prevent introduction of air into the silo 1 as generally taught in U.S. Patent 2,551,217. The silo 1 is supported on a suitable foundation 5 and includes a bottom chain unloader apparatus 6 disposed in the bottom of a silo for delivering silage 2 to a discharge passageway 7 within the foundation and terminating exteriorly of the silo 1. A chain driver or auger transfer unit 8 in the passageway transfers the material outwardly. The outer end of the passageway 7 is sealed by a transfer conduit 9 and rotary transfer device 10 constructed in accordance with the present invention. The unloading apparatus 6, 8 and 10 is driven through any suitable device shown diagrammatically as including a drive motor assembly 11 mounted upon conduit 9.

Generally, the silo includes a loading port 11a in the roof portion to permit introduction of the stored material. When it is desired to unload material, the assembly 11 is actuated to transfer the material from the silo 1 through the discharge passageway 7 and rotary transfer device 10 to a discharge pipe 12 of device 10. The transfer device 10 particularly maintains the end of the discharge passageway 7 and conduit 9 essentially sealed to prevent introduction of air or other deleterious gaseous products into silo 1 as presently described.

Figure 2:
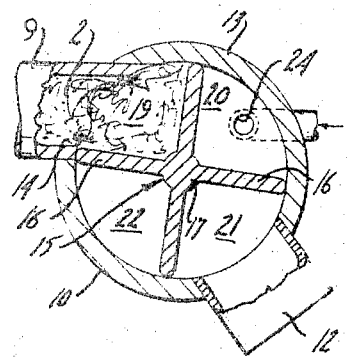
FIG. 2 is an enlarged vertical cross section of the rotary transfer device showing the discharging of material from the storage unit into a chamber.

Referring particularly to FIG. 2, which is an enlarged vertical cross section of the rotary transfer device 10, a generally cylindrical housing or casing 13 is mounted to the discharge end of the conduit 9. The casing 13 includes a transfer or inlet opening 14 aligned with the discharge end of the conduit 9 for the transfer of material from the passageway 7 into the casing 13. The outlet pipe 12 is provided on a diametrically opposite side of the casing 13. A multiple vane unit 15 is rotatably mounted within the casing 13 and includes four equi-circumferentially spaced vanes 16 interconnected to a common drive shaft 17. The axis of drive shaft 17 is normal to the conduit 9 and the outer end of the shaft 17 is coupled to the drive motor assembly 11 through an indexing unit 18 which provides a stepped drive to unit 15 in timed relation to the operation of the unloader. The rotating vanes 16 engage the inner wall of casing 13 and define four similar chambers 19, 20, 21 and 22 within the casing which are sequentially and cyclically aligned with the opening 14 and pipe 12.

A source of inert gas, shown diagrammatically as a pressurized tank 23, is connected to a gas inlet opening 24 in the casing 13 generally intermediate the inlet opening 14 and the discharge pipe 12. An electrically actuated valve 25 is shown in the gas line connection and is suitably connected to be energized whenever the drive assembly 11 is energized.

In operation, the silage 2 in the silo 1 is continuously transferred through the inlet opening 14 into the casing 13 and in particular into alignment with the chamber 19 defined by a pair of vanes 16 disposed to the opposite side thereof. As shown in FIG. 2, the vanes 16 are indexed to dispose the trailing vane adjacent the trailing end of the inlet opening 14 and to space the leading vane 16 somewhat forwardly thereof. In this position, the chamber 20 defined by trailing vane 16 is aligned with the inert gas inlet opening 24 in the casing 13. While the chamber 19 shown in alignment with the material inlet opening 14 is being filled with silage, air is being removed from the immediately succeeding or trailing chamber 20 and replaced with gas from tank 23.

Figure 3:
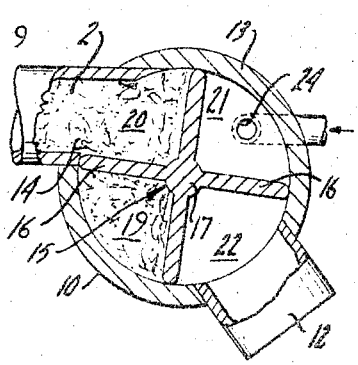
FIG. 3 is a view similar to FIG. 2 showing a second indexed position.
Figure 4:
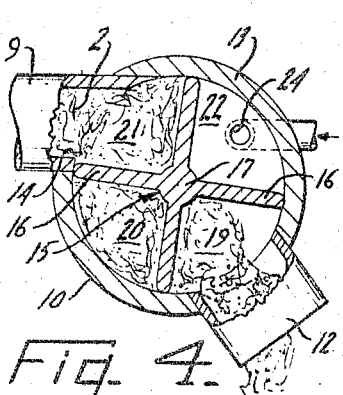
FIG. 4 shows the next sequence step where the first filled chamber is being emptied through a discharge opening.

In suitable timed relationship related to the rate of discharge of silage 2 into the casing 13, the vanes 16 are indexed to the position shown in FIG. 3 wherein the previously filled chamber 19 has been rotated 90 degrees and the chamber 20 filled with inert gas has now been similarly aligned with the material inlet opening 14. In this position the next trailing chamber 21 is aligned with the inert gas opening 24 to purge the corresponding chamber of air, and the step is completed with the filling of proper chamber 20 with silage. The vane unit is then indexed to the position shown in FIG. 4. The silage placed in the first chamber 19 is now discharged through the discharge outlet pipe 12 under force of gravity while the immediately opposite chamber 21 is being filled with silage, the trailing chamber 22 is having air replaced with a suitable inert gas. During the complete discharge cycle, the rotary vane unit 15 is indexed or otherwise rotated to sequentially present one or more of the gas-tight compartments or chambers 19–22 to the purging connection, the inlet or loading connection and the discharging connection.

The present invention thus provides a very simple and reliable means for eliminating one of the principal sources of gaseous contaminants in a sealed storage structure while permitting ready transfer of material with respect to such structure.

Various modes of carrying out the invention are contemplated as being within the scope of the following claims particularly pointing out and distinctly claiming the subject matter which is regarded as the invention.

I claim:
1. In an unloader for a storage structure having means for transferring of storage material from the storage structure through a discharge passagawey having an inlet portion and an outlet portion,
   a pressurized source of a protective gas having a gas discharge means,
   a transfer device having a plurality of chambers sequentially moved between said inlet portion and outlet portion,
   said gas discharge means being located to the trailing end of the inlet opening and filling said chambers with said gas as they pass said gas discharge means into alignment of the chamber with said inlet portion.

2. The unloader of claim 1 wherein said storage structure is a substantially hermetically sealed silo having a bottom unloader including a lateral discharge passageway,
   said transfer device includes a casing secured between the inlet portion and outlet portion of the passageway, said chambers being formed by circumferentially distributed blade elements rotatably mounted within said casing to define the plurality of chambers sequentially and cyclically aligned with the outlet portion and said gas discharge means is connected to said casing in alignment with the chamber subsequently aligned with said inlet portion.

3. The unloader of claim 1 wherein said storage structure is a hermetically sealed silo having a bottom unloader including a lateral discharge passageway and having drive means to actuate the first means and the transfer device in synchronism.

4. The unloader of claim 1 wherein said storage structure is a substantially hermetically sealed silo having a bottom unloader including a lateral discharge passageway,
   unload means disposed within the lateral passageway and periodically actuated to remove material from the silo,
   said transfer device includes a cylindrical casing with the periphery secured within the passageway and between the inlet portion and the outlet portion to connect the casing in the passageway, said outlet portion being a discharge opening, said chambers being formed by a rotor having circumferentially distributed blade elements, said rotor being rotatably mounted within said casing to sequentially and cylically align the chambers with the inlet portion and the discharge opening, drive means coupled to said unload means and to said rotor to establish synchronized operation, and said gas discharge means is connected to said casing in alignment with the chamber subsequently aligned with said passageway.

5. The unloader of claim 4 wherein said pressurized source includes control means to operatively connect the casing to transmit gas into the chamber and disconnect the source from the casing to prevent transmission of gas to the chamber, and means coupling said control means to said drive means to establish and actuate said control means with the rotation of the rotor.

References Cited

UNITED STATES PATENTS 2,489,925  11/1949  Omwake ---------- 214—17 X
2,551,217  5/1951  Martin.

ROBERT G. SHERIDAN, Primary Examiner

U.S. Cl. X.R.

99—235